(12) United States Patent
Yoo et al.

(10) Patent No.: US 12,266,058 B2
(45) Date of Patent: Apr. 1, 2025

(54) ELECTRONIC DEVICE FOR PROVIDING AUGMENTED REALITY SERVICE AND OPERATING METHOD THEREOF

(71) Applicant: SAMSUNG ELECTRONICS CO., LTD., Suwon-si (KR)

(72) Inventors: Jinseon Yoo, Suwon-si (KR); Sujin Lee, Suwon-si (KR); Minkyu Jung, Suwon-si (KR); Jongwoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 17/897,608

(22) Filed: Aug. 29, 2022

(65) Prior Publication Data

US 2023/0099603 A1   Mar. 30, 2023

Related U.S. Application Data

(63) Continuation of application No. PCT/KR2022/011231, filed on Jul. 29, 2022.

(30) Foreign Application Priority Data

Sep. 29, 2021   (KR) .......................... 10-2021-0128793

(51) Int. Cl.
*G09G 5/00* (2006.01)
*G02B 1/04* (2006.01)
(Continued)

(52) U.S. Cl.
CPC ............ *G06T 19/006* (2013.01); *G02B 1/041* (2013.01); *G02B 2027/0178* (2013.01)

(58) Field of Classification Search
CPC ....... G06T 19/006; G06T 19/00; G06F 3/011; G06F 3/012; G02B 27/017; G02B 1/041; G02B 2027/0178
(Continued)

(56) References Cited

U.S. PATENT DOCUMENTS 9,865,091 B2   1/2018 Giraldi et al.
9,996,974 B2   6/2018 Reisner-Kollmann et al.
(Continued)

FOREIGN PATENT DOCUMENTS

KR   10-2014-0146889   12/2014
KR   10-2019-0089627   7/2019
(Continued)

OTHER PUBLICATIONS

Search Report and Written Opinion dated Nov. 7, 2022 issued in International Patent Application No. PCT/KR2022/011231.
(Continued)

*Primary Examiner* — Gordon G Liu
(74) *Attorney, Agent, or Firm* — Nixon & Vanderhye, P.C.

(57) ABSTRACT

An electronic device according to various embodiments may include: a frame, a window supported by the frame, a display configured to output visual information to the window, a camera disposed in the frame configured to photograph a front of the frame, a communication module comprising communication circuitry, a memory, and a processor. The memory may store instructions that, when executed, cause the processor to: establish a communication connection with an external device through the communication module, acquire display attribute information of at least one first display connected to the external device, and display at least one virtual object having a same display attribute as the at least one first display in at least a portion of an area
(Continued)

corresponding to a field of view of a user wearing the electronic device, based on the acquired display attribute information. The display attribute information may include at least one of a magnification, a resolution, a display orientation, or a use or not of multiple displays, of the first display.

16 Claims, 14 Drawing Sheets

(51) Int. Cl.
    *G06T 19/00*     (2011.01)
    *G02B 27/01*     (2006.01)

(58) Field of Classification Search
    USPC .......................................................... 345/633
    See application file for complete search history.

(56) References Cited

U.S. PATENT DOCUMENTS

| | | | |
|---|---|---|---|
| 11,222,477 | B2 | 1/2022 | Moon et al. |
| 2016/0018654 | A1* | 1/2016 | Haddick ................ G06F 3/011 345/8 |
| 2016/0034039 | A1 | 2/2016 | Maeda et al. |
| 2017/0168296 | A1 | 6/2017 | Giwnewer et al. |
| 2017/0192734 | A1 | 7/2017 | Nie |
| 2019/0025587 | A1 | 1/2019 | Osterhout et al. |
| 2019/0034076 | A1* | 1/2019 | Vinayak ................ G06T 19/20 |
| 2019/0065026 | A1 | 2/2019 | Kiemele et al. |
| 2019/0227694 | A1 | 7/2019 | Shin et al. |
| 2021/0097768 | A1* | 4/2021 | Malia ..................... G06F 3/011 |
| 2021/0224020 | A1 | 7/2021 | Blume et al. |
| 2021/0278954 | A1 | 9/2021 | Nuber |
| 2023/0069255 | A1* | 3/2023 | Usui ...................... G06F 13/00 |

FOREIGN PATENT DOCUMENTS

| | | |
|---|---|---|
| KR | 10-2021-0063928 | 6/2021 |
| WO | 2016/021907 | 2/2016 |

OTHER PUBLICATIONS

Extended Search Report dated Oct. 21, 2024 in European Patent Application 22876652.3.

* cited by examiner

ELECTRONIC DEVICE FOR PROVIDING AUGMENTED REALITY SERVICE AND OPERATING METHOD THEREOF

CROSS-REFERENCE TO RELATED APPLICATIONS

This application is a continuation of International Application No. PCT/KR2022/011231 designating the United States, filed on Jul. 29, 2022, in the Korean Intellectual Property Receiving Office and claiming priority to Korean Patent Application No. 10-2021-0128793, filed on Sep. 29, 2021, in the Korean Intellectual Property Office, the disclosures of which are incorporated by reference herein in their entireties.

BACKGROUND

Field

The disclosure relates to an apparatus and method for providing an augmented reality service in an electronic device.

Description of Related Art

With the growth of information and communication technology and semiconductor technology, a variety of electronic devices are developing into multimedia devices capable of providing various multimedia services. The multimedia services may include at least one of a voice call service, a message service, a broadcast service, a wireless Internet service, a camera service, an electronic payment service, or a music play service.

The electronic device may provide a variety of experiences to a user. For example, the electronic device may provide an augmented reality (AR) service of adding virtual information (e.g., a virtual object) to a real space.

Remotely controlled environments such as telecommuting and Internet of things (IoT) are increasing, but it may be difficult to build a perfect computing environment with only a single mobile device including a smart phone. In order to create a complete computing environment, a monitor or a keyboard may be further required.

Also, in case of using a separate virtual computer in an augmented reality environment, it may differ from a real computing environment, thus causing a lower work efficiency.

SUMMARY

An electronic device according to various example embodiments may include: a frame, a window supported by the frame, a display configured to output visual information to the window, a camera disposed in the frame configured to photograph a front of the frame, a communication module comprising communication circuitry, a memory, and a processor operatively connected to the display, the communication module, and the camera. The memory may store instructions that, when executed, cause the processor to: establish a communication connection with an external device through the communication module, acquire display attribute information of at least one first display connected to the external device, and to display at least one virtual object having a same display attribute as the at least one first display in at least a portion of an area corresponding to a field of view of a user wearing the electronic device, based on the acquired display attribute information. The display attribute information may include at least one of a magnification, a resolution, a display orientation, or a use or not of multiple displays, of the first display.

A method for providing an augmented reality service at an electronic device according to various example embodiments may include: establishing a communication connection with an external device through a communication module comprising communication circuitry, acquiring display attribute information of at least one first display connected to the external device, and displaying at least one virtual object having a same display attribute as the at least one first display in at least a portion of an area corresponding to a field of view of a user wearing the electronic device, based on the acquired display attribute information. The display attribute information may include at least one of a magnification, a resolution, a display orientation, or a use or not of multiple displays, of the first display.

According to various example embodiments, an electronic device (e.g., an AR device) can provide the same environment as a real space even in a virtual space by scanning a display (e.g., a monitor) and an interface (e.g., a keyboard, a mouse, etc.) in the real world.

According to various example embodiments, the electronic device can remotely control a device in the same environment as reality. In addition, the electronic device can edit a virtual space as desired by a user and thereby increase a user experience (UX).

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
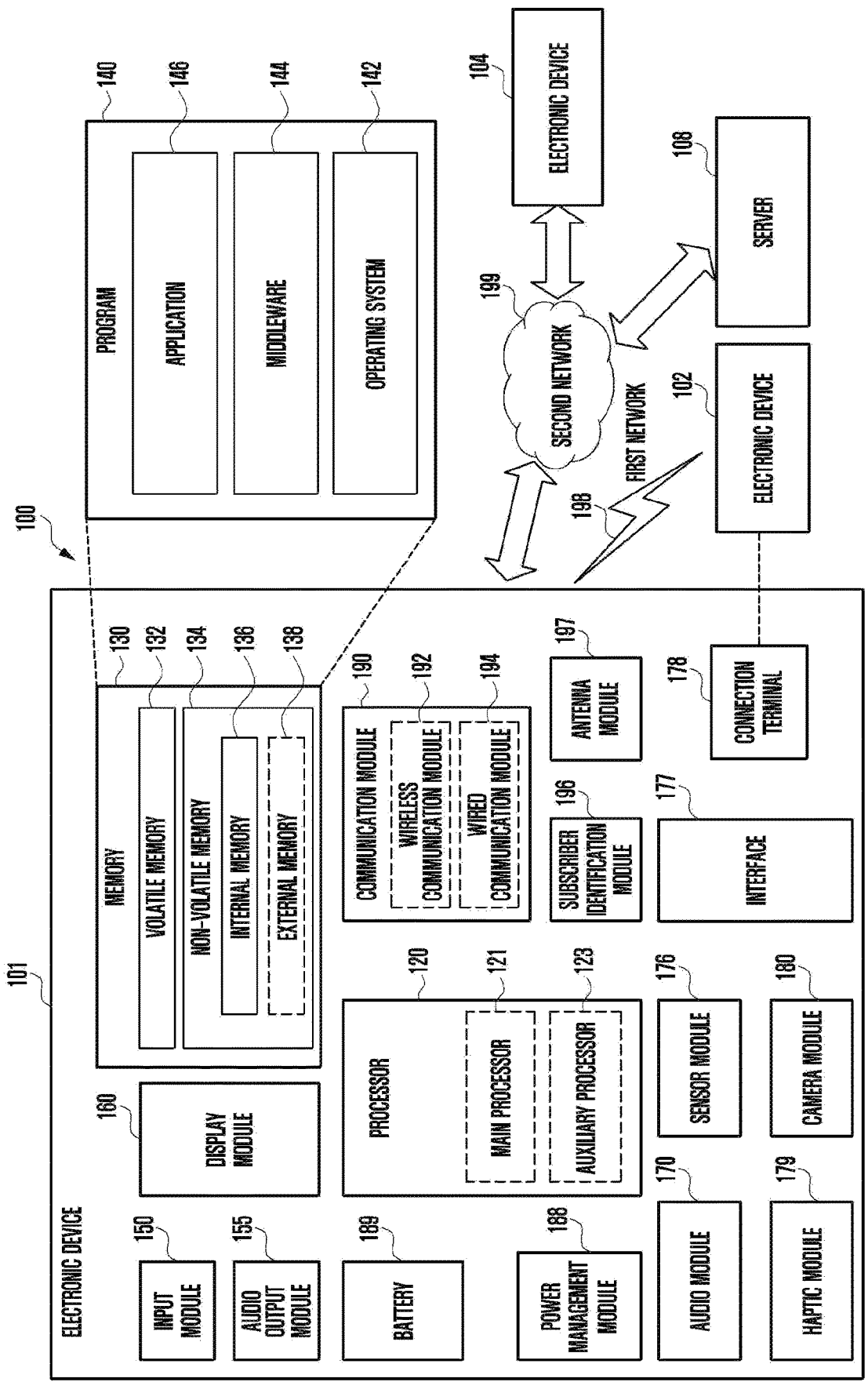
FIG. 1 is a block diagram illustrating an example configuration of a wearable device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
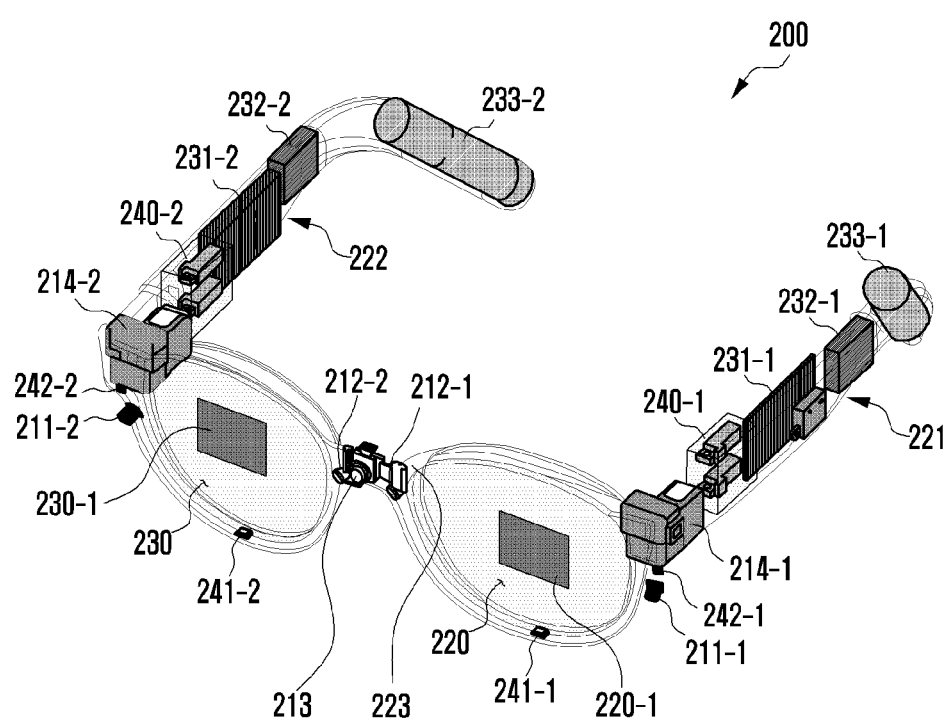
FIG. 2A is a diagram illustrating an example electronic device including a plurality of cameras according to various embodiments.

FIG. 2A is a diagram illustrating an example configuration of an electronic device 200 (e.g., the wearable device 101 in FIG. 1) including a plurality of cameras according to various embodiments.

In various embodiments, the electronic device 200 may include an electronic device 200 manufactured to be worn, for example, on a user's head. For example, the electronic device 200 may be constructed, but is not limited to, in the form of at least one of glasses, goggles, a helmet, or a hat. According to an embodiment, the electronic device 200 may include a plurality of transparent members (e.g., a first transparent member 220 and/or a second transparent member 230) respectively interlocking the user's both eyes (e.g., left and/or right eyes).

The electronic device 200 may provide an image related to an augmented reality (AR) service to the user. According to an embodiment, the electronic device 200 may project or display a virtual object on the first transparent member 220 and/or the second transparent member 230, thereby allowing at least one virtual object to be superimposed on reality that the user perceives through the first transparent member 220 and/or the second transparent member 230 of the electronic device 200.

With reference to FIG. 2A, the electronic device 200 according to an embodiment may include a body part 223, support parts (e.g., a first support part 221, a second support part 222), and hinge parts (e.g., a first hinge part 240-1, a second hinge part 240-2).

According to various embodiments, the body part 223 and the support parts 221 and 222 may be operatively connected through the hinge parts 240-1 and 240-2. The body part 223 may have a portion formed to be at least partially mounted on the user's nose.

According to various embodiments, the support parts 221 and 222 may include a support member having a shape that can be put over the user's ear. The support parts 221 and 222 may include a first support part 221 mounted on the left ear and/or a second support part 222 mounted on the right ear.

According to various embodiments, the first hinge part 240-1 may connect the first support part 221 and the body part 223 so that the first support part 221 is rotatable with respect to the body part 223. The second hinge part 240-2 may connect the second support part 222 and the body part 223 so that the second support part 222 is rotatable with respect to the body part 223. According to an embodiment, the hinge parts 240-1 and 240-2 of the electronic device 200 may be omitted. For example, the body part 223 and the support parts 221 and 222 may be directly connected.

According to various embodiments, the body part 223 may include at least one transparent member (e.g., the first transparent member 220, the second transparent member 230), at least one display module (e.g., a first display module 214-1, a second display module 214-2), at least one camera module (e.g., a front shooting camera module 213, eye tracking camera modules (e.g., a first eye tracking camera module 212-1, a second eye tracking camera module 212-2), recognition camera modules (e.g., a first recognition camera module 211-1, a second recognition camera module 211-2)), and at least one microphone (e.g., a first microphone 241-1, a second microphone 241-2).

In case of the electronic device 200 illustrated in FIG. 2A, light generated by the display modules 214-1 and 214-2 may be projected onto the transparent members 220 and 230 to display information. For example, light generated by the first display module 214-1 may be projected onto the first transparent member 220, and light generated by the second display module 214-2 may be projected onto the second transparent member 230. Light capable of representing a virtual object is projected onto the transparent members 220 and 230 formed of at least in part a transparent material, so that the user can recognize the reality superimposed with the virtual object. In this case, the display module 160 described in FIG. 1 may be understood as including the display modules 214-1 and 214-2 and the transparent members 220 and 230 of the electronic device 200 shown in FIG. 2. However, the electronic device 200 described in the disclosure is not limited to displaying information through the above-described scheme. The display module included in the electronic device 200 may be changed to a display module having various types of information display methods. For example, in case that a display panel including a light emitting element made of a transparent material is embedded in the transparent members 220 and 230 themselves, information displaying may be possible without a separate display module (e.g., the first display module 214-1, the second display module 214-2). In this case, the display module 160 described in FIG. 1 may refer to the transparent members 220 and 230 and the display panel included in the transparent members 220 and 230. At least one display module may include a light source module. The light source module generates light. Light generated by the light source module may be projected onto the transparent members 220 and 230 to display information.

According to various embodiments, the virtual object outputted through the display modules 214-1 and 214-2 may include information related to an application program executed in the electronic device 200 and/or information related to an external object located in the real space perceived by the user through the transparent members 220 and 230. The external object may include things existing in the real space. Hereinafter, the real space perceived by the user through the transparent members 220 and 230 will be referred to as a user's field of view (FoV) area. For example, in image information related to the real space acquired through the camera module (e.g., the shooting camera module 213) of the electronic device 200, the electronic device 200 may identify an external object included in at least a part of the area determined as the user's field of view (FoV). The electronic device 200 may output a virtual object related to the identified external object through the display modules 214-1 and 214-2.

According to various embodiments, the electronic device 200 may display a virtual object related to an augmented reality service together, based on image information related to the real space acquired through the shooting camera module 213 of the electronic device 200. According to an embodiment, the electronic device 200 may display the virtual object, based on the display module interlocked with user's both eyes (e.g., the first display module 214-1 interlocked with the left eye and/or the second display module 214-2 interlocked with the right eye). According to an embodiment, the electronic device 200 may display the virtual object, based on preset configuration information (e.g., resolution, frame rate, brightness, and/or display area).

According to various embodiments, the transparent members 220 and 230 may include a condensing lens (not shown) and/or a waveguide (e.g., a first waveguide 220-1 and/or a second waveguide 230-1). For example, the first waveguide 220-1 may be partially located in the first transparent member 220, and the second waveguide 230-1 may be partially located in the second transparent member 230. Light emitted from the display modules 214-1 and 214-2 may be incident on one surface of the transparent members 220 and 230. Light incident on one surface of the transparent members 220 and 230 may be transmitted to the user through the waveguides 220-1 and 230-1 located in the transparent members 220 and 230. The waveguides 220-1 and 230-1 may be made of glass, plastic, or polymer, and may include nano-patterns formed on one inner or outer surface. For example, the nano-pattern may include a polygonal or curved grating structure. According to an embodiment, light incident on one surface of the transparent members 220 and 230 may be propagated or reflected inside the waveguides 220-1 and 230-1 via the nano-pattern and transmitted to the user. According to an embodiment, the waveguides 220-1 and 230-1 may include at least one diffractive element (e.g., a diffractive optical element (DOE), a holographic optical element (HOE)) or a reflective element (e.g., a reflective mirror). According to an embodiment, using the at least one diffractive element or the reflective element, the waveguides 220-1 and 230-1 may guide light emitted from the display modules 214-1 and 214-2 to the user's eyes.

According to various embodiments, the electronic device 200 may include the shooting camera module 213 (e.g., an RGB camera module) for photographing an image within the user's field of view (FoV) and/or measuring a distance to an object, the eye tracking camera modules 212-1 and 212-2 for identifying the direction of a user's gaze, and/or recognition camera modules (gesture camera modules) 211-1 and 211-2 for recognizing a certain space. For example, the shooting camera module 213 may photograph the front direction of the electronic device 200, and the eye tracking camera modules 212-1 and 212-2 may photograph the opposite direction to the photographing direction of the shooting camera module 213. For example, the first eye tracking camera module 212-1 may partially photograph the user's left eye, and the second eye tracking camera module 212-2 may partially photograph the user's right eye. According to an embodiment, the shooting camera module 213 may include a high resolution (HR) camera module and/or a photo video (PV) camera module. According to an embodiment, the eye tracking camera modules 212-1 and 212-2 may detect the user's pupil and track the gaze direction. The tracked gaze direction may be utilized to move the center of a virtual image containing a virtual object in association with the gaze direction. According to an embodiment, the recognition camera modules 211-1 and 211-2 may detect a user gesture within a preconfigured distance (e.g., a predetermined space) and/or a predetermined space. The recognition camera modules 211-1 and 211-2 may include a camera module having a global shutter (GS). For example, the recognition camera modules 211-1 and 211-2 may be a camera module having the GS capable of reducing a rolling shutter (RS) phenomenon in order to detect and track a quick hand gesture and/or a minute finger gesture.

According to various embodiments, using one or more camera modules 211-1, 211-2, 212-1, 212-2, and 213, the electronic device 200 may detect eye(s) corresponding to a dominant eye and/or a non-dominant eye among the left eye and/or the right eye. For example, based on a user's gaze direction with respect to an external object or a virtual object, the electronic device 200 may detect eye(s) corresponding to the dominant eye and/or the non-dominant eye.

The number and position(s) of one or more camera modules (e.g., the shooting camera module 213, the eye tracking camera modules 212-1 and 212-2, and/or the recognition camera modules 211-1 and 211-2) included in the electronic device 200 shown in FIG. 2A may not be limited. For example, based on the form (e.g., shape or size) of the electronic device 200, the one or more camera modules (e.g., the shooting camera module 213, the eye tracking camera modules 212-1 and 212-2, and/or the recognition camera modules 211-1 and 211-2) may be variously changed in number and position(s).

According to various embodiments, the electronic device 200 may include at least one light emitting device (illumination LED) (e.g., a first light emitting device 242-1, a second light emitting device 242-2) to increase the accuracy of the at least one camera module (e.g., the shooting camera module 213, the eye tracking camera modules 212-1 and 212-2, and/or the recognition camera modules 211-1 and 211-2). For example, the first light emitting device 242-1 may be disposed at a portion corresponding to the user's left eye, and the second light emitting device 242-2 may be disposed at a portion corresponding to the user's right eye. In an embodiment, the light emitting devices 242-1 and 242-2 may be used as auxiliary means for increasing the accuracy when photographing the user's pupils with the eye tracking camera modules 212-1 and 212-2, and may include an IR LED that generates light of an infrared wavelength. In addition, the light emitting devices 242-1 and 242-2 may be used as an auxiliary means in a dark environment or an environment where it is not easy to detect a subject to be photographed due to the mixing of various light sources and reflected light when photographing a user's gesture with the recognition camera modules 211-1 and 211-2.

According to various embodiments, the electronic device 200 may include a microphone (e.g., the first microphone 241-1 and a second microphone 241-2) for receiving a user's voice and ambient sounds. For example, the microphones 241-1 and 241-2 may be components included in the audio module 170 of FIG. 1.

According to various embodiments, the first support part 221 and/or the second support part 222 may include a printed circuit board (PCB) (e.g., a first printed circuit board 231-1, a second printed circuit board 231-2), a speaker (e.g., a first speaker 232-1, a second speaker 232-2), and/or a battery (e.g., a first battery 233-1, a second battery 233-2).

According to various embodiments, the speakers 232-1 and 232-2 may include the first speaker 232-1 for delivering an audio signal to the user's left ear and the second speaker 232-2 for delivering an audio signal to the user's right ear. The speakers 232-1 and 232-2 may be components included in the audio module 170 of FIG. 1.

According to various embodiments, the electronic device 200 may include a plurality of batteries 233-1 and 233-2 and supply power to the printed circuit boards 231-1 and 231-2 through a power management module (e.g., the power management module 188 in FIG. 1). For example, the plurality of batteries 233-1 and 233-2 may be electrically connected to the power management module (e.g., the power management module 188 in FIG. 1).

Although it is described above that the electronic device 200 is a device that displays augmented reality, the electronic device 200 may be a device that displays virtual reality (VR). In this case, the transparent members 220 and 230 may be formed of an opaque material so that the user cannot recognize the real space through the transparent members 220 and 230. Also, the transparent members 220 and 230 may function as the display module 160. For example, the transparent members 220 and 230 may include a display panel for displaying information.

Figure 2B:
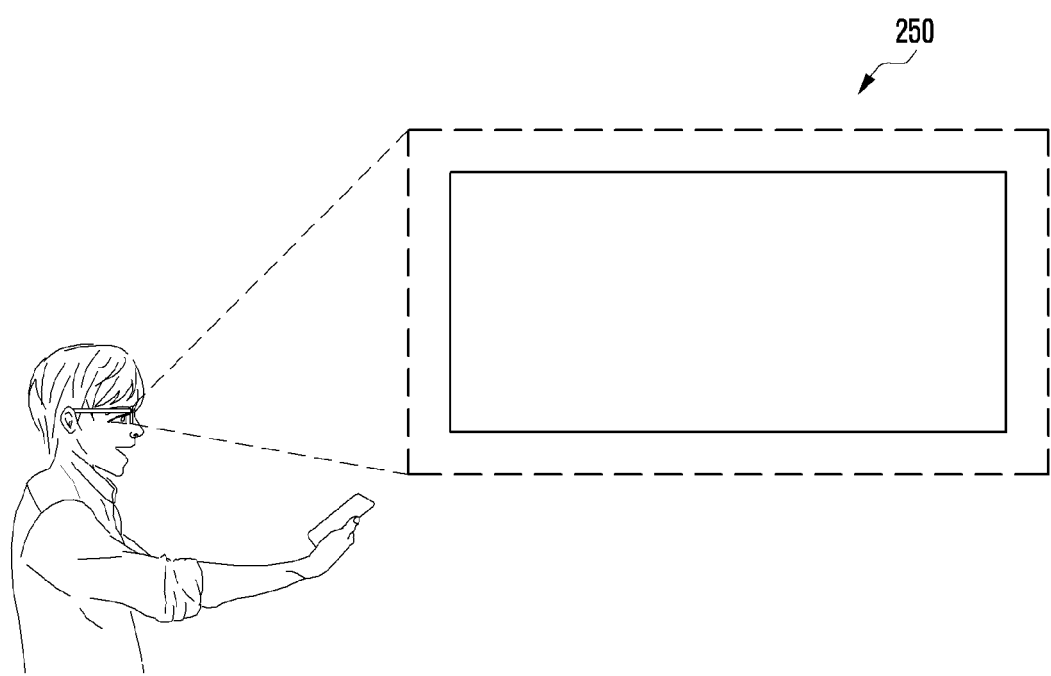
FIG. 2B is a diagram illustrating an operation of providing an augmented reality service in an electronic device according to various embodiments.

FIG. 2B is a diagram illustrating an example operation of providing an augmented reality service in an electronic device according to various embodiments.

With reference to FIG. 2B, the electronic device 200 may be worn on a user's head and provide an image to the user. According to an embodiment, the electronic device 200 may provide an augmented reality (AR) service that adds virtual information (e.g., a virtual object) to at least a portion of an image (e.g., a preview image) interlocked with a real space acquired through a camera (e.g., the camera module 180 in FIG. 1) of the electronic device 200. According to an embodiment, the electronic device 200 may provide the AR service that display the virtual information (e.g., the virtual object) to overlap with at least a part 250 of the real space interlocked with a field of view (FOV) of a user who wears the electronic device 200. For example, the electronic device 200 may provide the AR service by adding the virtual information (e.g., the virtual object) for displaying in at least the part 250 of the real space to light entering the eyes of a wearer of the electronic device 200. For example, the electronic device 200 may be implemented in the form of at least one of glasses, goggles, a helmet, or a hat, but is not limited thereto.

Figure 3:
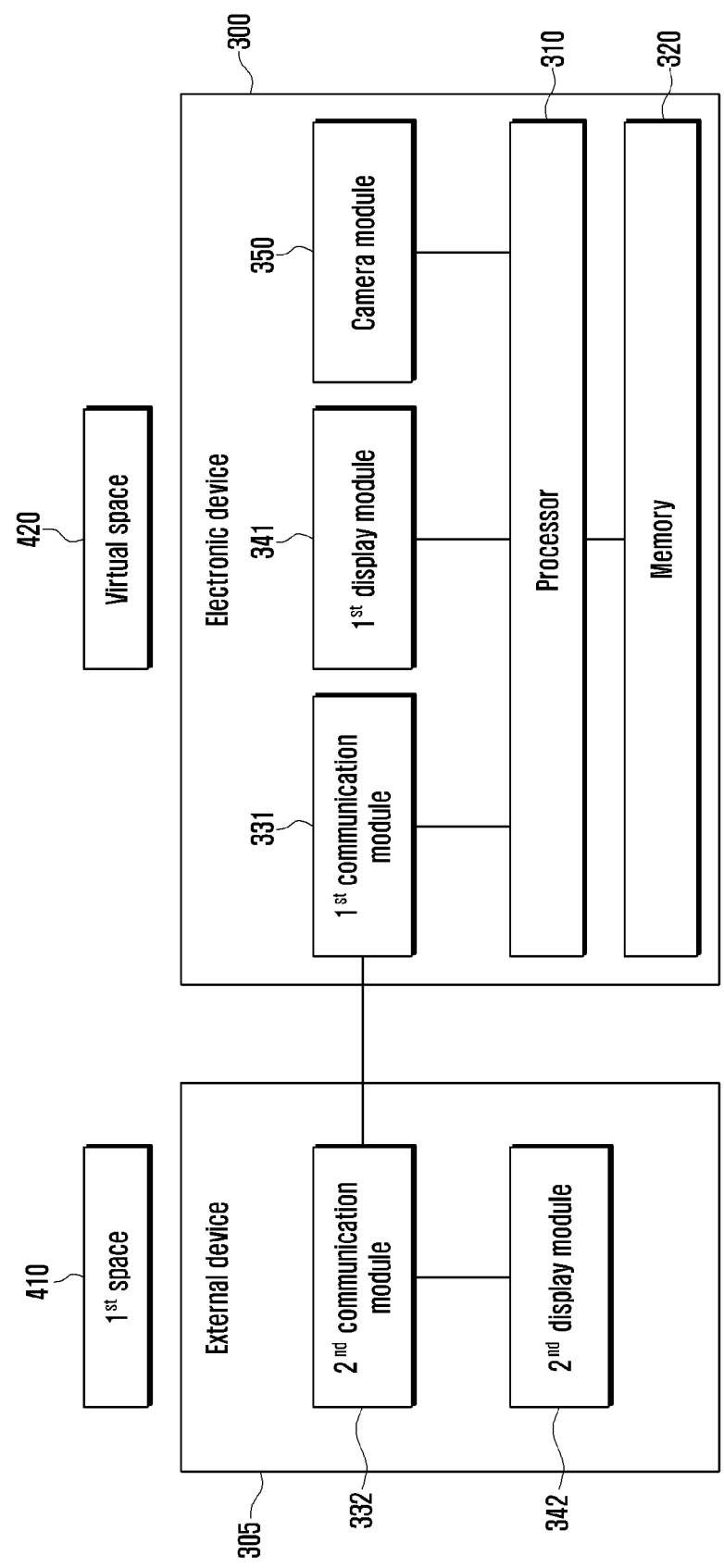
FIG. 3 is a block diagram illustrating an example configuration of an electronic device according to various embodiments.

FIG. 3 is a block diagram illustrating an example configuration of an electronic device according to various embodiments.

The electronic device 300 according to various embodiments may include a processor (e.g., including processing circuitry) 310, a memory 320, a first communication module (e.g., including communication circuitry) 331, a first display module (e.g., including a display and/or display circuitry) 341, and a camera module (e.g., including a camera) 350. It will be understood that some of the illustrated components may be omitted or substituted. The electronic device 300 may further include at least some of the components and/or functions of the wearable device 101 of FIG. 1 or the electronic device 200 of FIG. 2. At least some of the illustrated (or not illustrated) components of the electronic device may be operatively, functionally, and/or electrically connected.

According to various embodiments, the processor 310 may include various processing circuitry and is a component capable of performing an operation or data processing related to control and/or communication of each component of the electronic device 300, and may include of one or more processors. The processor 310 may include at least some of the components and/or functions of the processor 120 shown in FIG. 1.

According to various embodiments, there will are no limitations on operation and data processing functions that the processor 310 can implement in the electronic device, but a feature of remotely controlling an external device 305 in a virtual space will be described in detail hereinafter. The operations of the processor 310 may be performed by loading instructions stored in the memory 320.

According to various embodiments, the electronic device 300 may include one or more memories 320, which may include a main memory and a storage. The main memory may include a volatile memory such as dynamic random access memory (DRAM), static RAM (SRAM), or synchronous dynamic RAM (SDRAM). Also, the memory 320 may include a large-capacity storage device as a non-volatile memory. The storage may include at least one of one-time programmable ROM (OTPROM), PROM, EPROM, EEPROM, mask ROM, flash ROM, flash memory, hard drive, or solid state drive (SSD). The memory 320 may store various file data, and the stored file data may be updated according to the operation of the processor 310.

According to various embodiments, the first communication module 331 may include various communication circuitry and communicate with the second communication module (e.g., including communication circuitry) 332 of the external device 305 through a wireless network under the control of the processor 310. The first communication module 331 may include hardware and software modules for transmitting/receiving data to/from a cellular network (e.g., a long term evolution (LTE) network, a 5G network, a new radio (NR) network) and a short-range network (e.g., Wi-Fi, Bluetooth). The first communication module 331 may include at least some of the configuration and/or functions of the communication module 190 shown in FIG. 1.

According to various embodiments, the first display module 341 may include a display and/or various display circuitry and display various images under the control of the processor 310. The first display module 341 may be electrically connected to drive a display panel (not shown). The display panel (not shown) may be implemented with one of, but is not limited to, a liquid crystal display (LCD), a light-emitting diode (LED) display, or an organic light-emitting diode (OLED) display. The display panel (not shown) may be formed as a touch screen that senses a touch and/or proximity touch (or hovering) input using a part (e.g., a finger) of the user's body or an input device (e.g., a stylus pen). The first display module 341 may include at least some of the configuration and/or functions of the display module 160 shown in FIG. 1.

According to an embodiment, the external device 305 may include, for example, a desktop. The external device 305 may be operatively connected to a display device (e.g., a monitor) and/or an interface (e.g., a keyboard, a mouse). Hereinafter, the display device will be described by way of non-limiting example as a monitor, but is not limited thereto, and may include any device that displays information for visual or three-dimensional reception, storage, and transmission. Hereinafter, the interface will be described by way of non-limiting example as a keyboard or a mouse, but is not limited thereto, and may include any device in charge of a user interface among computer peripheral devices.

According to various embodiments, the electronic device 300 may include a frame, a window member supported by the frame, a display module (e.g., the first display module 341) outputting visual information to the window member, the camera module 350 disposed in the frame to photograph a front of the frame, a communication module (e.g., the first communication module 331), the memory 320, and the processor 310.

According to various embodiments, the memory 320 may store instructions that, when executed, cause the processor 310 to establish a communication connection with the external device 305 through the communication module 331, to acquire display attribute information of at least one first display 341 connected to the external device 305, and to display at least one virtual object having the same display attribute as that of the at least one first display 341 in at least a portion of an area corresponding to a field of view of a user wearing the electronic device 300, based on the acquired display attribute information. In this case, the display attribute information may include at least one of a magnification, a resolution, a display orientation, or a use or not of multiple displays, of the first display 341.

According to various embodiments, the electronic device 300 may be operatively connected to the external device 305 through the first communication module 331. Using the first communication module 331, the electronic device 300 may request information about a display device (e.g., a monitor) and/or an interface (e.g., a keyboard, a mouse) connected to the external device 305. The external device 305 may acquire display configuration information (e.g., magnification, layout, resolution, orientation, etc.) of the display device (e.g., the monitor) connected through a second display module (e.g., including a display and/or various display circuitry) 342, and transmit the display configuration information to the electronic device 300 through the second communication module 332.

According to various embodiments, the electronic device 300 may include the camera module 350. The camera module 350 may include at least some of the configuration and/or functions of the camera module 180 shown in FIG. 1 or of the at least one camera module shown in FIG. 2 (e.g., the front shooting camera module 213, the eye tracking camera modules (e.g., the first eye tracking camera module 212-1, the second eye tracking camera module 212-2), the recognition camera modules (e.g., the first recognition camera module 211-1, the second recognition camera module 211-2)).

According to an embodiment, in image information related to the real space acquired using the camera module 350 of the electronic device 300, the electronic device 300 may identify an external object included in at least a part of an area determined as the user's field of view (FoV).

According to an embodiment, the memory 320 may store instructions to photograph at least one first display 341 connected to the external device 305 in the field of view of the user wearing the electronic device 300 using the camera module 350, and to acquire physical information including at least one of a number, a location, and a distance to the user, of the at least one first display 341.

According to various embodiments, the electronic device 300 may be operatively connected to the external device 305 through the communication module (e.g., the first communication module 331), and receive related information that includes at least one of the number, magnification(s), layout (s), and resolution(s) of at least one or more display devices connected to the external device 305 and at least one of the number, type(s), and shape(s) of at least one or more interfaces. The electronic device 300 may display a second monitor and a second interface in a virtual space through the display module (e.g., the first display module 341) to be interlocked with at least one or more first monitors and at least one or more first interfaces connected to the external device 305, and it may operatively connect the second monitor and the second interface displayed in the virtual space to the external device 305 to remotely control the external device 305 in the virtual space.

Figure 4:
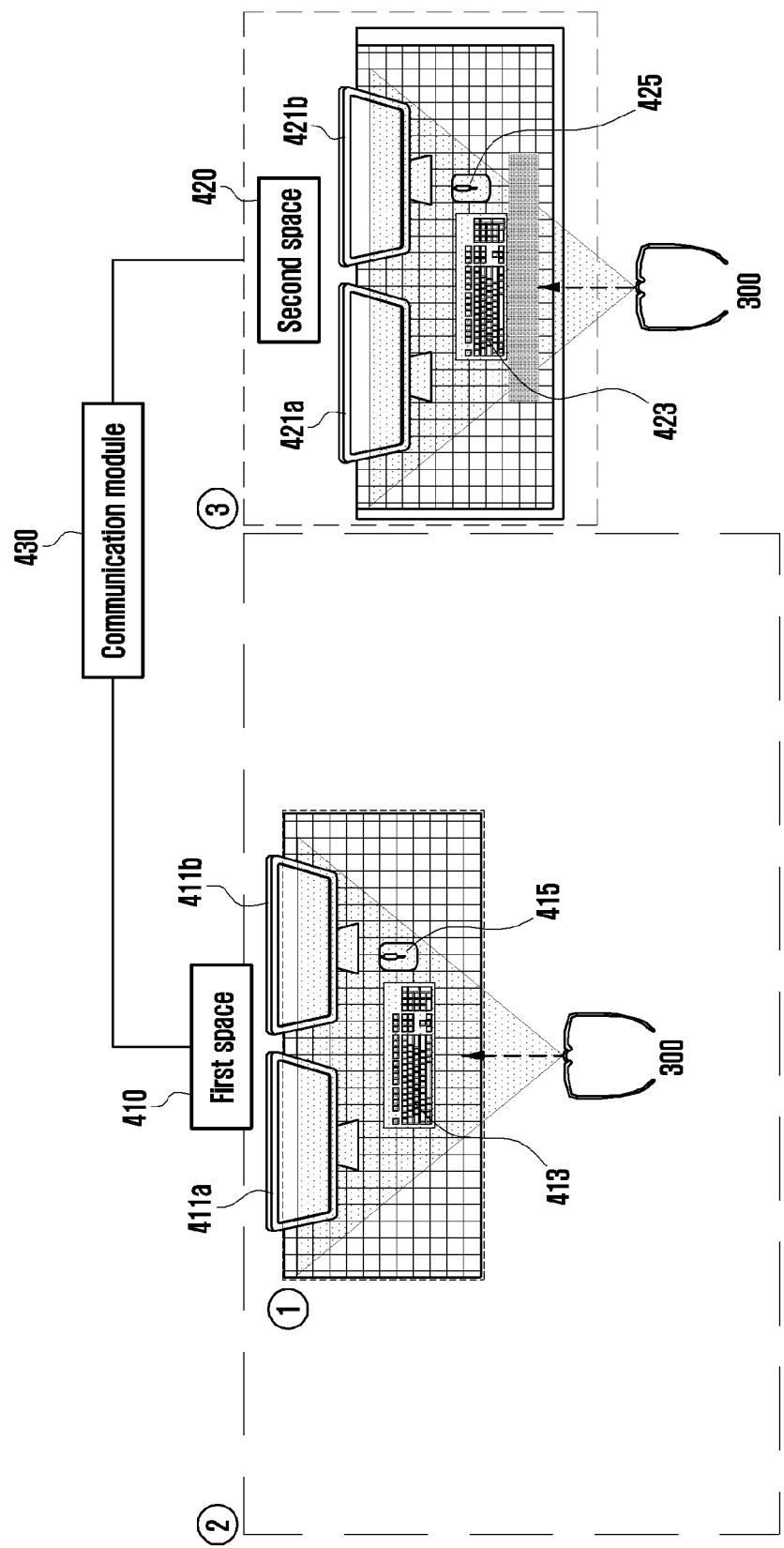
FIG. 4 is a diagram illustrating an example operation of providing a virtual physical environment identical to a real environment at an electronic device according to various embodiments.

FIG. 4 is a diagram illustrating an example operation of providing a virtual physical environment identical to a real environment at an electronic device according to various embodiments.

According to an embodiment, a memory (e.g., the memory 320 in FIG. 3) may store instructions for photographing at least one first display connected to the external device 305 within a field of view of a user of wearing the electronic device 300 using a camera module (e.g., the camera module 350 in FIG. 3), and for acquiring physical information including at least one of the number, location, and distance to the user, of the at least one first display.

According to FIG. 4, the electronic device 300 may receive, from the external device 305 through the first communication module 331, information about at least one or more first monitors 411a and 411b and at least one or more first interfaces 413 and 415, connected to the external device 305. According to an embodiment, using the camera module 350, the electronic device 300 may recognize the at least one or more first monitors 411a and 411b and at least one or more first interfaces 413 and 415 connected to the external device 305.

According to an embodiment, based on information recognized using the camera module 350, the electronic device 300 may display second monitors 421a and 421b and second interfaces 423 and 425 in a virtual space 420 to be interlocked with the at least one or more first monitors 411a and 411b and at least one or more first interfaces 413 and 415 connected to the external device (e.g., the external device 305 in FIG. 3).

According to FIG. 4, the at least one or more first monitors 411a and 411b and at least one or more first interfaces 413 and 415 connected to the external device 305 may be located in a first space 410, and the second monitors 421a and 421b and the second interfaces 423 and 425 may be disposed in the virtual space 420. The first space 410 may include a part of the real space, may vary in size according to a surrounding environment or user's setting, and is not limited to a specific space.

According to an embodiment, the at least one or more first monitors 411a and 411b and at least one or more first interface 413 and 415 connected to the external device 305 in the first space 410 may be operatively connected to the second monitors 421a and 421b and the second interfaces 423 and 425 in the virtual space 420. Using the communication module (e.g., including communication circuitry) 430, the electronic device 300 may remotely control the at least one or more first monitors 411a and 411b and at least one or more first interface 413 and 415 connected to the external device 305 in the first space 410.

According to an embodiment, the memory 320 may store instructions to display the at least one virtual object to be identical with the at least one first display 341 in at least one of the number, the location, and the distance to the user, based on the physical information of the at least one first display 341. In this case, the physical information may refer to at least one of the number, a location, and a distance to the user, of the first display 341.

According to an embodiment, the memory 320 may store instructions to photograph at least one user interface connected to the external device 305 in the field of view of the user wearing the electronic device 300 using the camera module 350, and to acquire physical information including at least one of the number, a type, a location, and a distance to the user, of the at least one user interface.

According to an embodiment, the memory 320 may store instructions to display the at least one virtual object to be identical with the at least one user interface in at least one of the number, the type, the location, and the distance to the user, based on the acquired physical information of the at least one user interface. In this case, the physical information of the user interface may include at least one of the number, a type, a location, and a distance to the user, of the at least one user interface.

Figure 5:
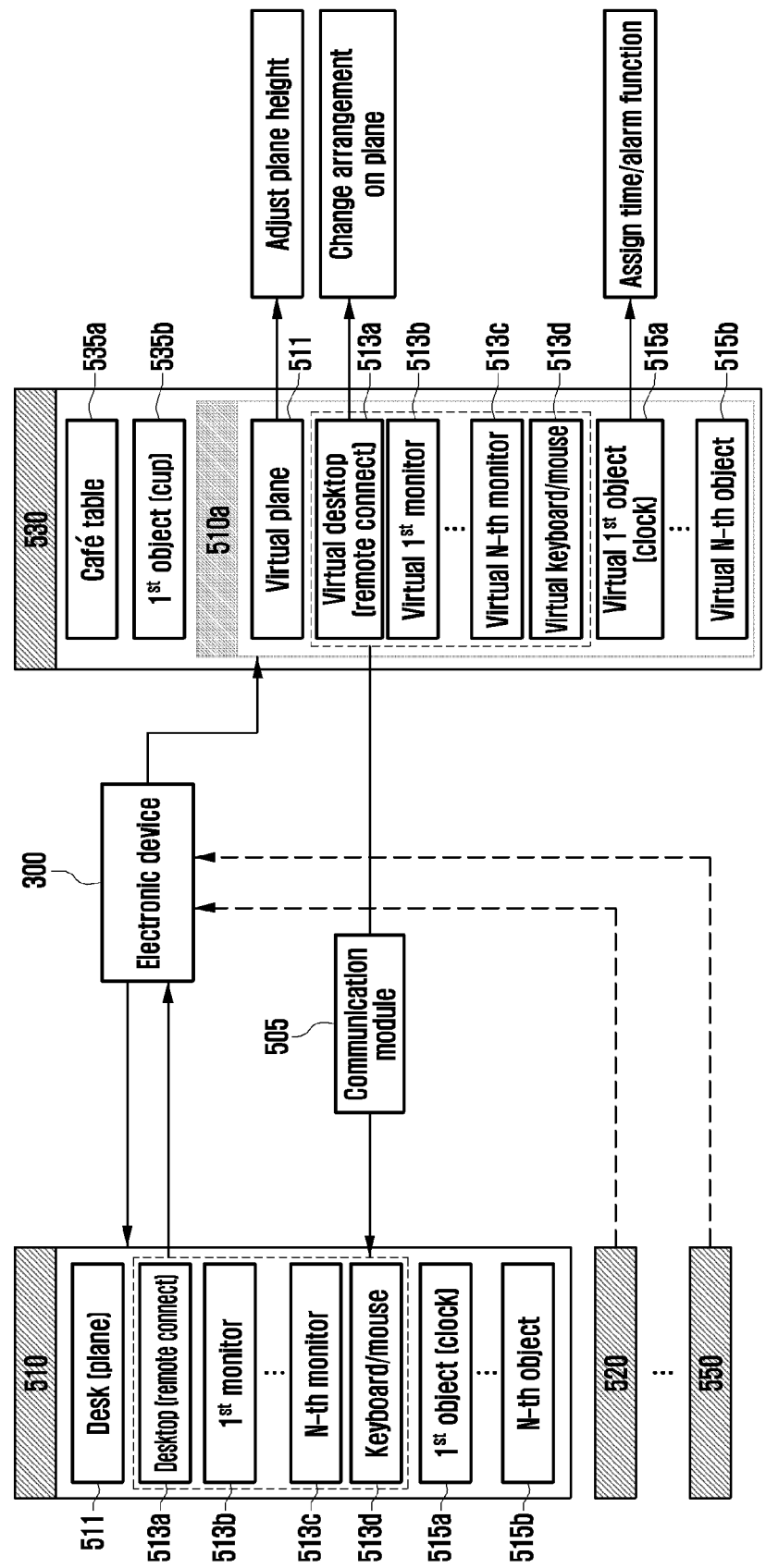
FIG. 5 is a diagram illustrating an example component-based process of providing a virtual physical environment identical to a real environment at an electronic device according to various embodiments.

FIG. 5 is a diagram illustrating an example component-based process of providing a virtual physical environment identical to a real environment at an electronic device according to various embodiments.

According to FIG. 5, a first space 510 may include a part of the real space, may vary in size according to a surrounding environment or user's setting, and is not limited to a specific space. The first space 510 may include a desk 511, an external device 513a (e.g., a desktop), at least one or more display devices (e.g., a first monitor 513b to an N-th monitor 513c), at least one or more interfaces 513d (e.g., a keyboard, a mouse), and at least one or more general objects 515a and 515b (e.g., a clock, a calendar). The general object may refer to an object incapable of communication connection with the electronic device 300.

According to FIG. 5, the real space is not limited to the first space 510 and may further include a second space 520 to an N-th space 550. The second space 520 to the N-th space 550 are parts of the real space and may vary in sizes according to the surrounding environment or user's setting.

According to an embodiment, the electronic device 300 may receive information related to at least one or more first monitors and at least one or more first interfaces connected to the external device 305 from the external device 305 through a communication module (e.g., the first communication module 331), and recognize the number, magnification, layout, and resolution of the first monitor(s) and the type and shape of the first interface(s) using the received information related to the first monitor(s) and first interface(s) connected to the external device 305. Also, the electronic device 300 may display, through a display module (e.g., the first display module 341), a second monitor and a second interface in a virtual space 530 to be interlocked with the at least one or more first monitors and at least one or more first interfaces connected to the external device 305, and operatively connect the second monitor and the second interface displayed in the virtual space with the external device 305 to remotely control the external device 305 in the virtual space.

According to an embodiment, the electronic device 300 may display a virtual desk 511, an external device 513a (e.g., a desktop), at least one or more display devices (e.g., a first monitor 513b to an N-th monitor 513c), at least one or more interfaces 513d (e.g., a keyboard, a mouse), and at least one or more general objects 515a and 515b (e.g., a clock, a calendar) in a first virtual space 510a to be interlocked with the at least one or more first monitors and at least one or more first interfaces connected to the external device 305 in the first space 510.

According to an embodiment, the electronic device 300 may construct the second space 520 to the N-th space 550, in addition to the first space 510, in the virtual space 530. The electronic device 300 may provide a guide screen for selecting at least one of the first space 510 and the second space 520 to the N-th space 550 and, based on a user input through the guide screen, display corresponding components (e.g., the virtual desk 511, the external device 513a (e.g., the desktop), the at least one or more display devices (e.g., the first monitor 513b to the N-th monitor 513c), the at least one or more interfaces 513d (e.g., the keyboard, the mouse), and the at least one or more general objects 515a and 515b (e.g., the clock, the calendar)) in the virtual space 530.

In addition, the electronic device 300 may display components (e.g., a desk/café table 535a, a general object 535b) in a specific environment (e.g., a cafe) in which the virtual space 530 is implemented, together with the components corresponding to the first space 510.

According to an embodiment, the corresponding components (e.g., the virtual desk 511, the external device 513a (e.g., the desktop), the at least one or more display devices (e.g., the first monitor 513b to the N-th monitor 513c), and the at least one or more interfaces 513d (e.g., the keyboard, the mouse)) in the virtual space 530 may be operatively connected to the desk 511, the external device 513a (e.g., the desktop), the at least one or more display devices (e.g., the first monitor 513b to the N-th monitor 513c), and the at least one or more interfaces 513d (e.g., the keyboard, the mouse) in the first space 510 through the communication module 505.

Figure 6A:
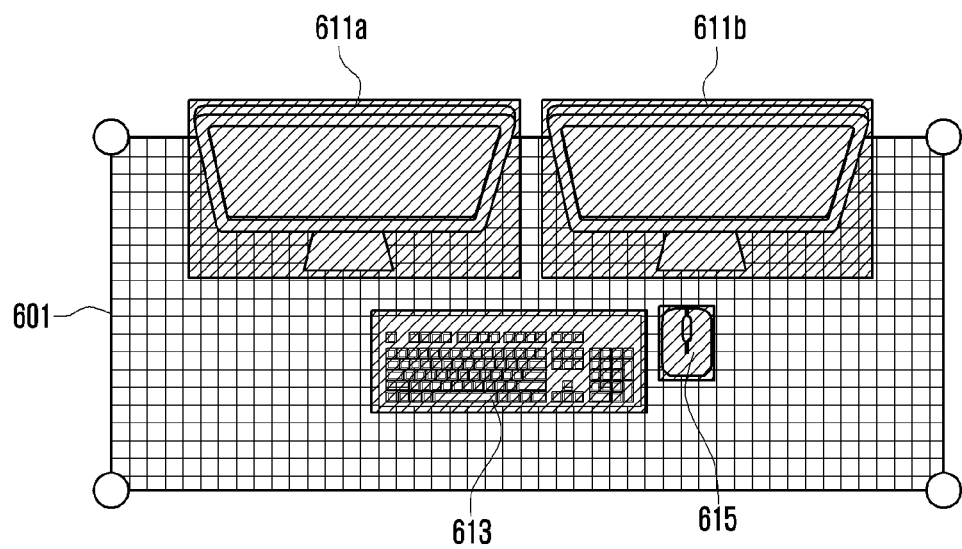
FIGS. 6A and 6B are diagrams illustrating an example where an electronic device recognizes locations of real objects and determines locations of virtual objects, according to various embodiments.
Figure 6A:
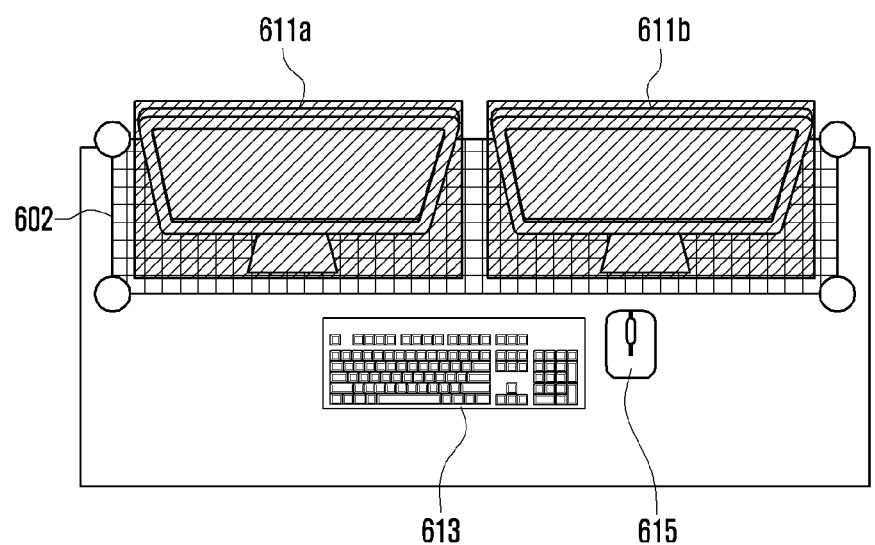
Figure 6B:
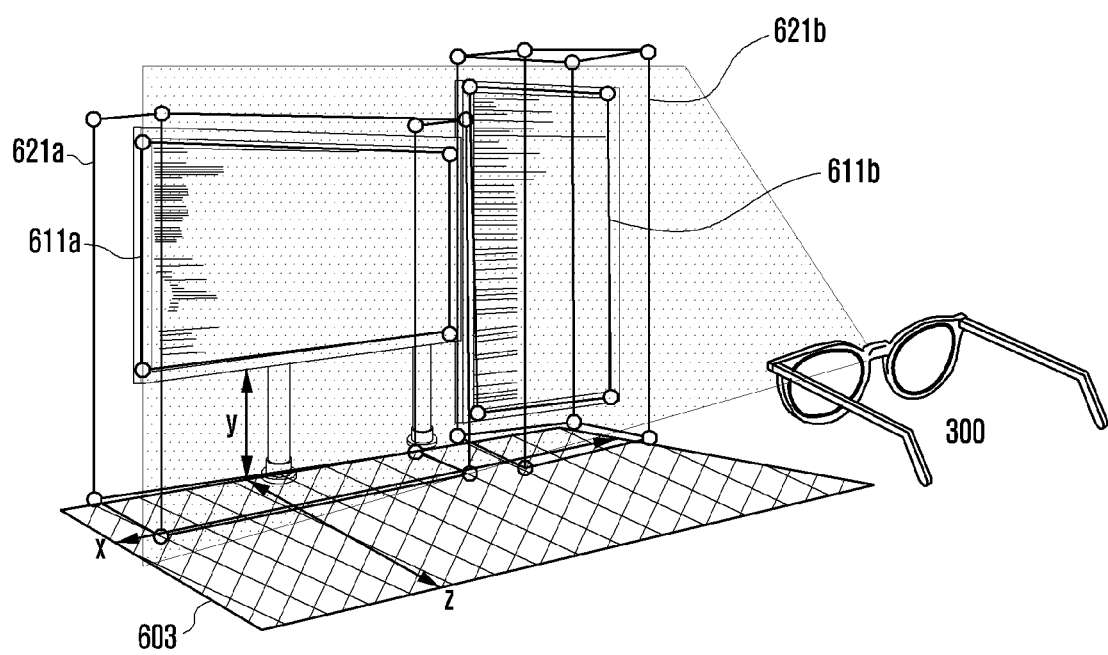

FIGS. 6A and 6B are diagrams illustrating examples in which an electronic device recognizes locations of real objects and determines locations of virtual objects, according to various embodiments.

According to an embodiment, the electronic device 300 may establish an area 601 displayed with absolute coordinates in a field of view of the electronic device 300, recognize objects 611a, 611b, 613, and 615 disposed in the area using a camera module (e.g., the camera module 350 in FIG. 3), and establish relative coordinates for the recognized at least one or more objects 611a, 611b, 613, and 615 based on a specific point. In addition, the electronic device 300 may provide a guide screen capable of adjusting a size 602 of the area displayed with absolute coordinates in the field of view of the electronic device 300, and recognize a user input through the guide screen. The absolute coordinates may refer to two-dimensional coordinates in a rectangular shape including horizontal and vertical axes or three-dimensional coordinates including horizontal, vertical, and height axes.

Referring to FIG. 6B, in an embodiment, the electronic device 300 may establish an area 603 displayed with absolute coordinates in the field of view of the electronic device 300, and recognize objects 611a, 611b, 621a, and 621b disposed in the area using the camera module (e.g., the camera module 350 in FIG. 3).

Referring to FIG. 6B, there may be at least one or more display devices (a first monitor 621a of the desktop, a second monitor 621b of the desktop) in the area 603 displayed with absolute coordinates in the field of view of the electronic device 300. The electronic device 300 may recognize physical characteristics (height from the desk, arrangement, relative spacing, distance from the user, etc.) of the first monitor 621a and the second monitor 621b using the camera module 350, and implement them in a virtual space (e.g., the virtual space 420 in FIG. 4).

The electronic device 300 may acquire display configuration information (e.g., magnification, layout, resolution, orientation, etc.) of the display device (the first monitor 621a of the desktop, the second monitor 621b of the desktop) connected to an external device (e.g., the external device 305 in FIG. 3) using a communication module (e.g., the first communication module 331 in FIG. 3), and equally apply the acquired information to a virtual display device in the virtual space 420.

Figure 7A:
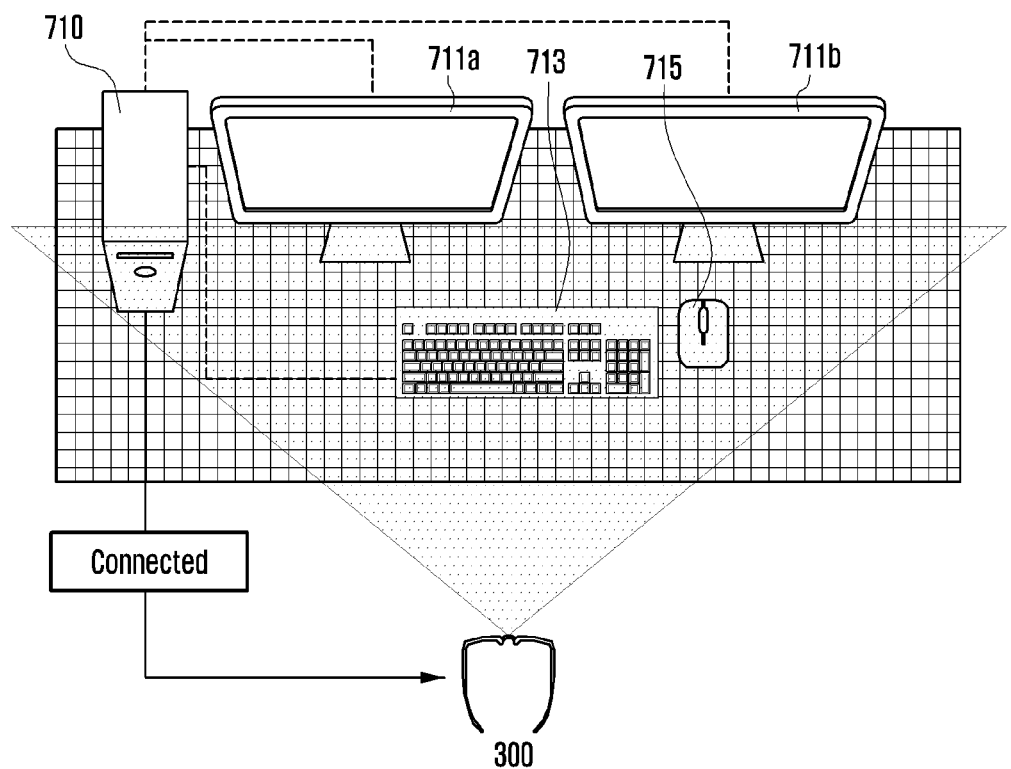
FIG. 7A is a diagram illustrating an example where there is one external device connectable to an electronic device according to various embodiments.
Figure 7B:
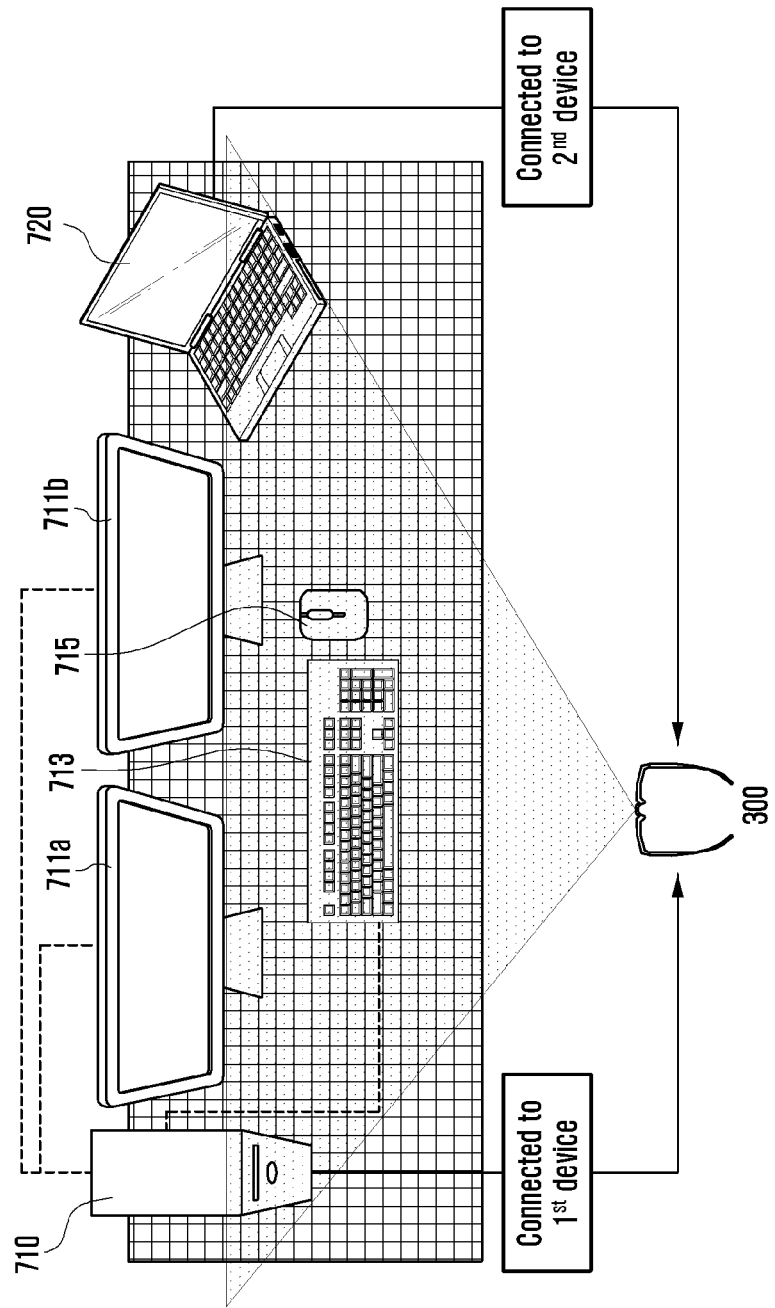
FIG. 7B is a diagram illustrating an example where there are a plurality of external devices connectable to an electronic device according to various embodiments.

FIG. 7A is a diagram illustrating an example where there is one external device connectable to an electronic device according to various embodiments, and FIG. 7B is a diagram illustrating an example where there are a plurality of external devices connectable to an electronic device according to various embodiments.

According to various embodiments, in FIG. 7A, the electronic device 300 may receive information related to at least one or more first monitors 711*a* and 711*b* and at least one or more first interfaces 713 and 715, connected to a first external device 710, from the first external device 710 through a communication module (e.g., the first communication module 331), and recognize the number, magnification, layout, and resolution of the first monitors 711*a* and 711*b* and the type and shape of the first interfaces 713 and 715 using the received information related to the first monitors 711*a* and 711*b* and first interfaces 713 and 715 connected to a first external device 710. Also, the electronic device 300 may display a second monitor and a second interface in a virtual space through a display module (e.g., the first display module 341) so as to correspond to the at least one or more first monitors 711*a* and 711*b* and at least one or more first interfaces 713 and 715 connected to the first external device 710, and remotely control the external device 710 in the virtual space by operatively connecting the second monitor and the second interface displayed in the virtual space to the first external device 710.

Referring to FIG. 7B, the electronic device 300 may be additionally connected to a second external device 720 in addition to the first external device 710. In this case, the electronic device 300 may be connected to the second external device 720 through the first communication module 331 like the first external device 710. In addition, the electronic device 300 may display a second monitor and a second interface in the virtual space so as to correspond to at least one or more monitors and at least one or more interfaces connected to the second external device 720, and remotely control the external device 720 in the virtual space by operatively connecting the second monitor and the second interface displayed in the virtual space to the second external device 720.

Figure 8A:
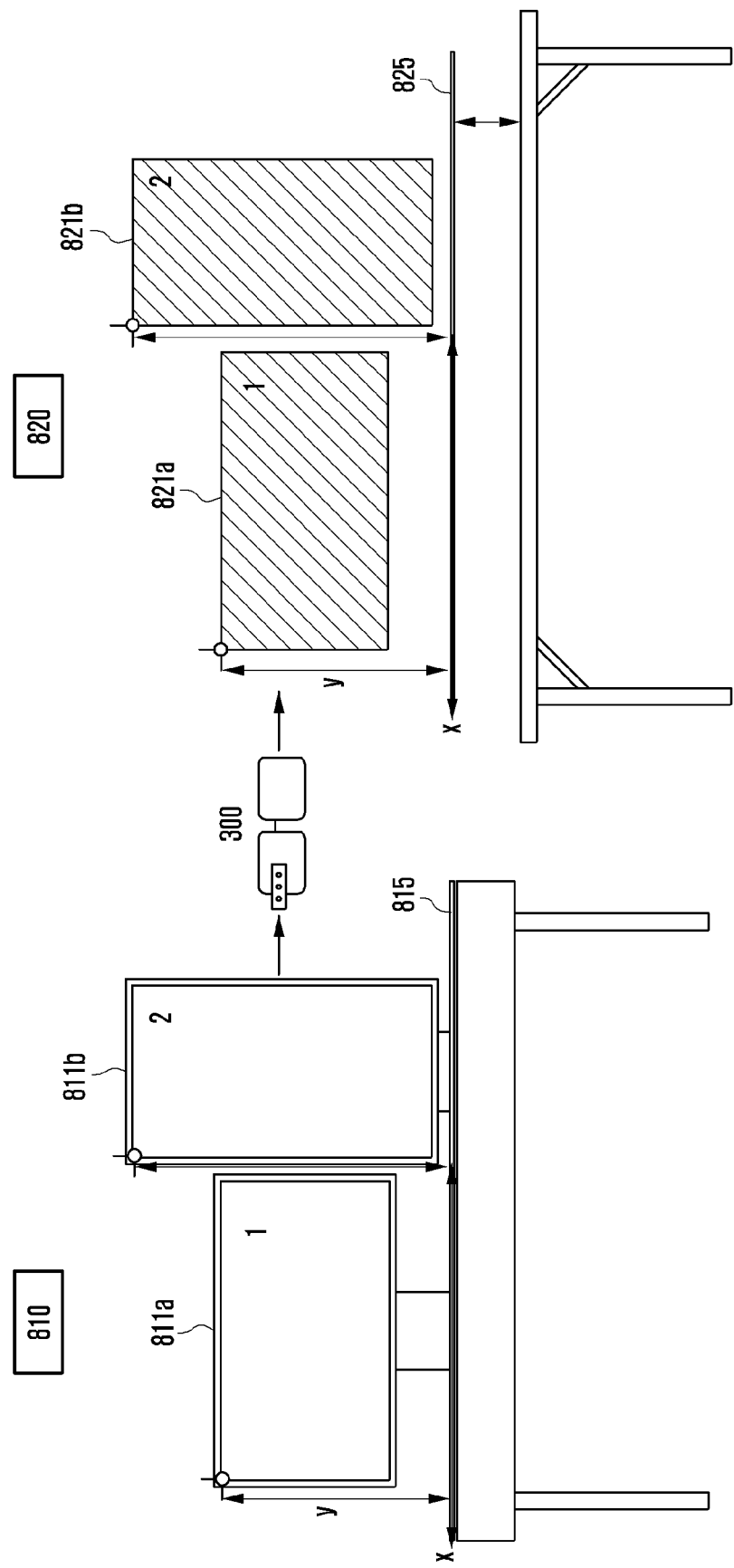
FIGS. 8A and 8B are diagrams illustrating an example where an electronic device implements an environment identical to a physical environment in a virtual space and edits a virtual object according to various embodiments.
Figure 8B:
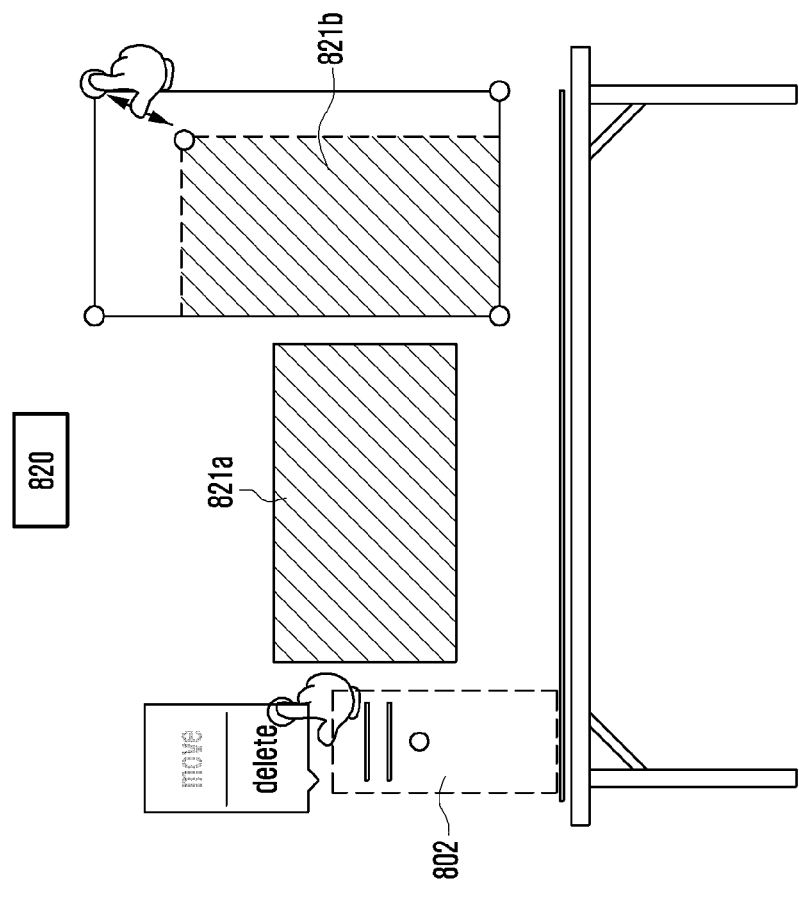
Figure 8B:
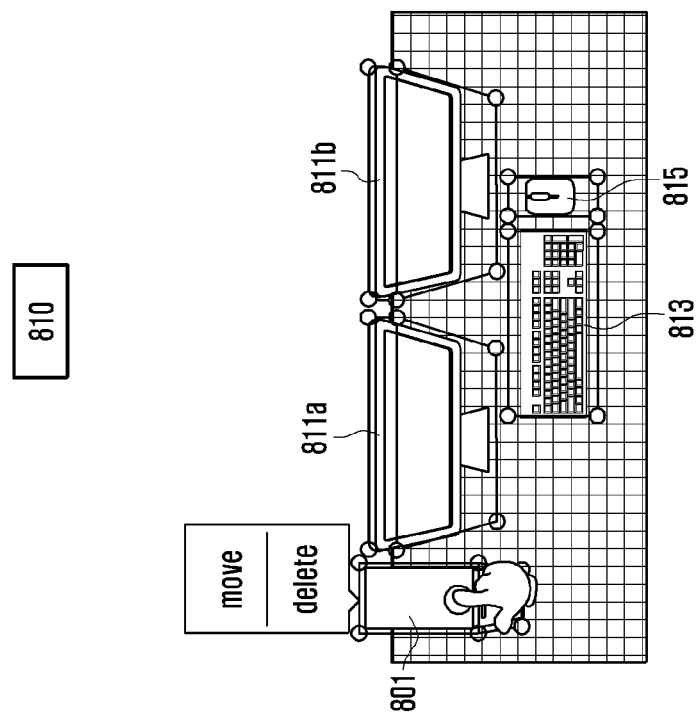

FIGS. 8A and 8B are diagrams illustrating examples where an electronic device implements an environment identical to a physical environment in a virtual space and edits a virtual object according to various embodiments.

According to FIGS. 8A and 8B, at least one or more first monitors 811*a* and 811*b* and at least one or more first interfaces (e.g., a main body 801) connected to an external device (e.g., the external device 305 in FIG. 3) may be located in a first space 810, and second monitors 821*a* and 821*b* and second interfaces (e.g., a virtual body 802) may be located in a virtual space 820. The first space 810 may include a part of the real space, may vary in size according to a surrounding environment or user's setting, and is not be limited to a specific space.

According to FIG. 8A, the at least one or more first monitors 811*a* and 811*b* may be disposed on a first desk 815. According to an embodiment, a specific environment (e.g., a cafe) in which the virtual space 820 is implemented may also include a second desk 825. In this case, the first desk 815 and the second desk 825 may have different heights, and the electronic device 300 may recognize and correct such a height difference using a camera module (e.g., the camera module 350 in FIG. 3). For example, the electronic device 300 may recognize that the height of the first monitor 811*a* is y with respect to the first desk 815. Thereafter, when implementing the second monitor 821*a* in the virtual space 820, the electronic device 300 does not dispose the second monitor 821*a* to have a height of y with respect to the second desk 825, but corrects the height of the second desk 825 to be equal to that of the first desk 815 and then dispose the second monitor 821*a* to have a height of y with respect to the corrected place. The electronic device 300 may dispose another second monitor 821*b* in a similar manner. The electronic device 300 may provide the user with the same environment as the real space through such arrangement.

According to an embodiment, the electronic device 300 may provide a guide screen for changing the arrangement of the second monitors 821*a* and 821*b* and the second interface 802 displayed in the virtual space 820, deleting some objects, or adding some objects, and recognize a user input through the guide screen.

According to an embodiment, the electronic device 300 may edit the second monitors 821*a* and 821*b* and the second interface 802 displayed in the virtual space 820, based on a user input through the guide screen.

Referring to FIG. 8B, the electronic device 300 may change the sizes of the second monitors 821*a* and 821*b*. In this case, the resolutions of the second monitors 821*a* and 821*b* may be maintained the same as or similar to those of the first monitors 811*a* and 811*b*. Also, the electronic device 300 may provide a guide screen for adding some objects (e.g., a monitor) and additionally display some objects based on a user input on the guide screen. Conversely, the electronic device 300 may provide a guide screen for deleting some objects and delete some objects based on a user input on the guide screen.

According to an embodiment, the memory 320 may store instructions to further display at least one virtual object in the field of view of the user wearing the electronic device 300, based on a user input, and the at least one virtual object may include a display.

According to an embodiment, the memory 320 may store instructions to provide a guide for changing a location of the at least one virtual object, deleting some objects, or adding some objects, and recognize a user input through the guide.

According to an embodiment, the memory 320 may store instructions to further display at least one virtual object in the field of view of the user wearing the electronic device 300, based on a user input, and the at least one virtual object may include a user interface.

Figure 9:
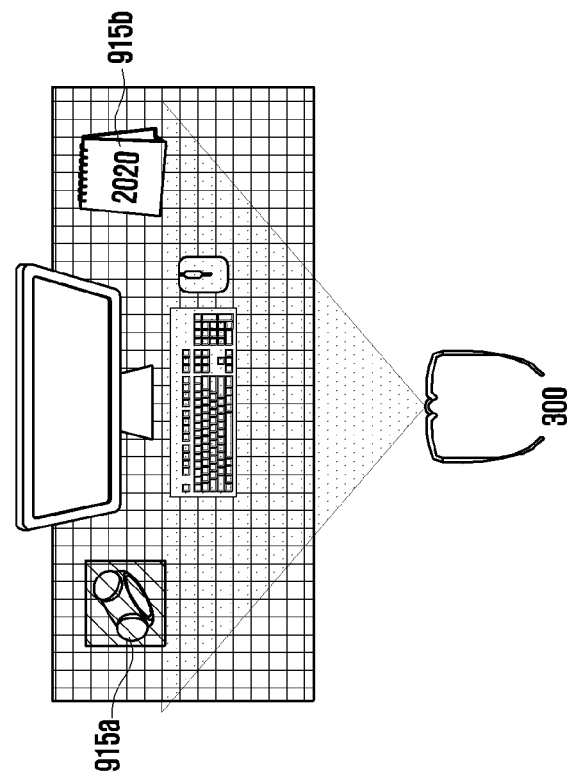
FIG. 9 is a diagram illustrating an example where an object displayed in a virtual space is edited at an electronic device according to various embodiments.
Figure 9:
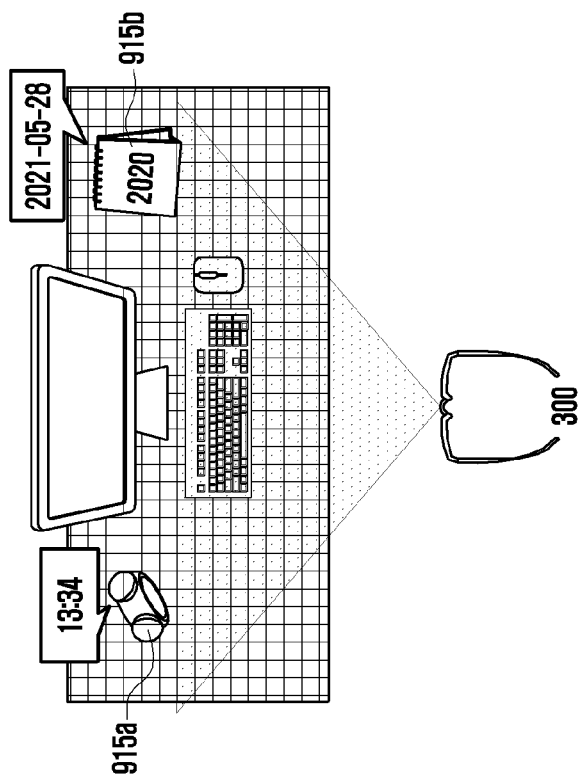

FIG. 9 is a diagram illustrating an example where an object displayed in a virtual space is edited at an electronic device according to various embodiments.

According to an embodiment, the electronic device 300 may provide a guide screen for changing or deleting an arrangement of objects 915*a* and 915*b* incapable of communication with the electronic device 300 in a virtual space (e.g., the virtual space 420 in FIG. 4), and recognize a user input through the guide screen.

According to an embodiment, the general objects 915*a* and 915*b* may provide information or perform a role of decoration in the virtual space 420. The electronic device 300 may recognize the types (e.g., a clock, a calendar) of the general objects 915*a* and 915*b* and control to perform a preconfigured widget function. For example, the electronic device 300 may recognize a clock 915*a* and control to perform a function of notifying the time, or recognize a calendar 915*b* and control to perform a function of indicating a date. The number or types of the general objects 915*a* and 915*b* is not limited thereto and may vary depending on the situation of a place (e.g., a house, a cafe) in which the virtual space 420 is implemented.

According to an embodiment, when the user selects the general object 915*a* or 915*b* in the virtual space 420, the electronic device 300 may provide a guide screen for configuring it as a widget having a different function, and recognize a user input through the guide screen. Based on the user input, the electronic device 300 may change the function performed by the general object 915*a* or 915*b*. For example, when the user selects the clock 915*a*, the electronic device 300 may display a guide screen for moving or deleting the clock 915*a* or providing a widget function. The widget function may be preconfigured at the time of manufacture, and may further include various functions such as a calendar and weather in addition to a timer function related to the clock 915*a*. When the user selects a weather function on the guide screen, the electronic device 300 may display a weather widget after deleting the clock from the position where the clock 915*a* is displayed, or display a weather widget together with the clock. The widget function that can be configured by the electronic device 300 is not limited thereto.

According to an embodiment, the memory 320 may store instructions to provide a guide for changing a location of the at least one virtual object, deleting some objects, or adding some objects, and recognize a user input through the guide.

According to an embodiment, the memory 320 may store instructions to display a preconfigured widget on at least one virtual object in an area corresponding to the field of view of the user wearing the electronic device 300, or to provide a guide for the user to select at least one virtual object and configure to display a widget performing another function, and the widget may include a function of displaying at least one of date, time, weather, and screen of an application installed in the electronic device.

Figure 10:
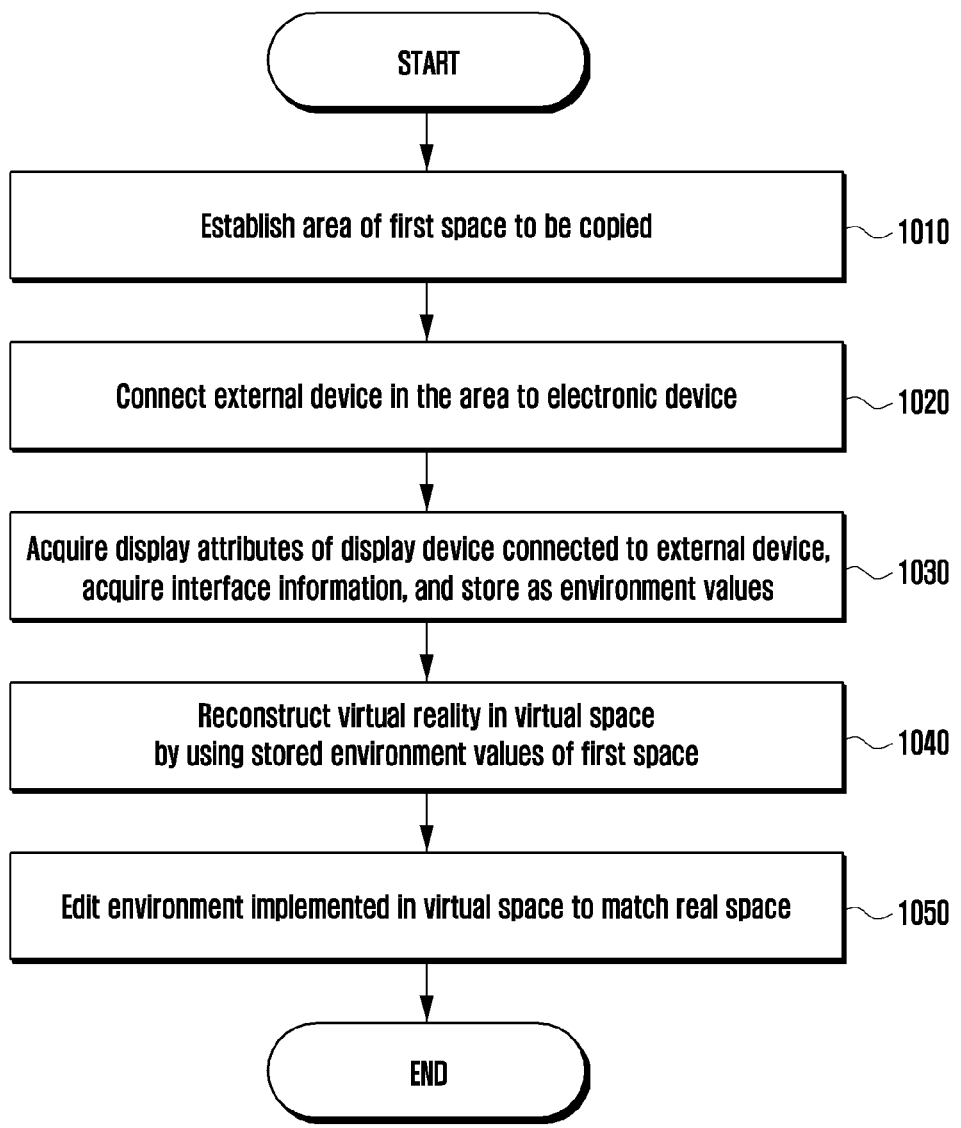
FIG. 10 is a flowchart illustrating an example method for providing an augmented reality service at an electronic device according to various embodiments.

FIG. 10 is a flowchart illustrating an example method for providing an augmented reality service at an electronic device according to various embodiments.

The operations described with reference to FIG. 10 may be implemented based on instructions that may be stored in a computer recording medium or memory (320 in FIG. 3). The illustrated method may be performed by the electronic device (e.g., the electronic device 300 in FIG. 3) described above with reference to FIGS. 1 to 9, and the technical features described above may not be repeated below.

According to various embodiments, the augmented reality service providing method of the electronic device 300 may include operations of receiving information related to at least one or more first monitors and at least one or more first interfaces connected to an external device (e.g., the external device 305 in FIG. 3) from the external device 305 through a communication module (e.g., the first communication module 331 in FIG. 3), recognizing the number, magnification, layout, and resolution of the first monitor(s) and the type and shape of the first interface(s) using the received information related to the first monitor(s) and first interface(s) connected to the external device 305, displaying, through a display module (e.g., the first display module 341 in FIG. 3), a second monitor and a second interface in a virtual space (e.g., the virtual space 420 in FIG. 4) to be interlocked with the at least one or more first monitors and at least one or more first interfaces connected to the external device 305, and operatively connecting the second monitor and the second interface displayed in the virtual space 420 with the external device 305 to remotely control the external device 305 in the virtual space 420.

At operation 1010, the electronic device 300 may establish an area of a first space (e.g., the first space 410 in FIG. 4) to be copied into the virtual space 420. This has been described in FIG. 6A. The first space 410 may include a part of the real space, may vary in size according to a surrounding environment or user's setting, and is not be limited to a specific space.

According to an embodiment, the electronic device 300 may establish an area displayed with absolute coordinates in a field of view of the electronic device 300, recognize objects disposed in the area using a camera module (e.g., the camera module 350 in FIG. 3), and establish relative coordinates for the recognized at least one or more objects. In addition, the electronic device 300 may provide a guide screen capable of adjusting a size of the area displayed with absolute coordinates in the field of view of the electronic device 300, and recognize a user input through the guide screen.

At operation 1020, the electronic device 300 may be operatively connected to an external device (e.g., the external device 305 in FIG. 3) through a first communication module (e.g., the first communication module 331 in FIG. 3). The electronic device 300 may remotely control a display device and/or interface operatively connected to the external device 305 through the first communication module 331. Here, the external device 305 may refer to a computing device disposed in the first space 410 to be copied at the operation 1010. This has been described in FIGS. 3 to 5.

At operation 1030, using the first communication module 331, the electronic device 300 may request information about a display device (e.g., a monitor) and/or an interface (e.g., a keyboard, a mouse) connected to the external device 305. The external device 305 may acquire display configuration information (e.g., magnification, layout, resolution, orientation, etc.) of a display device (e.g., a monitor) connected through a second display module 342, and transmit the display configuration information to the electronic device 300 through the second communication module 342. The electronic device 300 may acquire display configuration information (e.g., magnification, layout, resolution, orientation, etc.) of the display device (the first monitor 621*a* of the desktop, the second monitor 621*b* of the desktop in FIG. 6) connected to the external device 305 using the communication module 331, and equally apply the acquired information to a virtual display device in the virtual space 420. This has been described in FIGS. 4 to 6B.

At operation 1040, the electronic device 300 may realize a virtual reality in the virtual space 420 using the stored value of the first space 410. This has been described in FIG. 5.

According to an embodiment, based on the information recognized using the camera module 350, the electronic device 300 may display a second monitor (e.g., 421*a* and 421*b* in FIG. 4) and a second interface (e.g., 423 and 425 in FIG. 4) in the virtual space 410 to be interlocked with the at least one or more first monitors (e.g., 411*a* and 411*b* in FIG. 4) and at least one or more first interfaces (e.g., 413 and 415 in FIG. 40 connected to the external device (e.g., the external device 305 in FIG. 3).

For example, according to FIG. 5, the electronic device 300 may display a virtual desk 511, an external device 513*a* (e.g., a desktop), at least one or more display devices (e.g., a first monitor 513*b* to an N-th monitor 513*c*), at least one or more interfaces 513*d* (e.g., a keyboard, a mouse), and at least one or more general objects 515*a* and 515*b* (e.g., a clock, a calendar) in a first virtual space 510*a* to be interlocked with the at least one or more first monitors and at least one or more first interfaces connected to the external device 305 in the first space 510.

At operation 1050, the electronic device 300 may edit the virtual reality implemented in the virtual space 420 to match the real space. This has been described in FIGS. 8A to 9.

According to an embodiment, the electronic device 300 may provide a guide screen for changing or deleting an arrangement of an object (e.g., 915*a*, 915*b*) incapable of communication with the electronic device 300 in the virtual space 420, and recognize a user input through the guide screen.

According to an embodiment, the electronic device 300 may recognize the type of the object 915a or 915b incapable of communication with the electronic device 300 in the virtual space 420, and accordingly give a preconfigured widget function or, when the user selects the object, provide a guide screen for configuring it as a widget having another function and then recognize a user input through the guide screen.

A method for providing an augmented reality service at an electronic device according to various example embodiments may include: establishing a communication connection with an external device through a communication module, acquiring display attribute information of at least one first display connected to the external device, and displaying at least one virtual object having a same display attribute as the at least one first display in at least a portion of an area corresponding to a field of view of a user wearing the electronic device, based on the acquired display attribute information. The display attribute information may include at least one of a magnification, a resolution, a display orientation, or a use or not of multiple displays, of the first display.

According to an example embodiment, the method may further include photographing at least one first display connected to the external device in the field of view of the user wearing the electronic device using a camera module, and acquiring physical information including at least one of a number, a location, and a distance to the user, of the at least one first display.

According to an example embodiment, the method may further include displaying the at least one virtual object to be identical with the at least one first display in at least one of the number, the location, and the distance to the user, based on the physical information of the at least one first display.

According to an example embodiment, the method may further include: photographing at least one user interface connected to the external device in the field of view of the user wearing the electronic device using the camera module, and acquiring physical information including at least one of a number, a type, a location, and a distance to the user, of the at least one user interface.

According to an example embodiment, the method may further include displaying the at least one virtual object to be identical with the at least one user interface in at least one of the number, the type, the location, and the distance to the user, based on the acquired physical information of the at least one user interface.

According to an example embodiment, the method may further include further displaying at least one virtual object in the field of view of the user wearing the electronic device, based on an input. The at least one virtual object may include a display.

According to an example embodiment, the method may further include: providing a guide for changing a location of the at least one virtual object, deleting some objects, or adding some objects, and recognizing an input through the guide.

According to an example embodiment, the method may further include: further displaying at least one virtual object in the field of view of the user wearing the electronic device, based on an input, providing a guide for changing a location of the at least one virtual object, deleting some objects, or adding some objects, and recognizing an input through the guide. The at least one virtual object may include a user interface.

According to an example embodiment, the method may further include displaying a specified widget on at least one virtual object in an area corresponding to the field of view of the user wearing the electronic device, and providing a guide to select at least one virtual object and configure to display a widget performing another function. The widget may include a function of displaying at least one of date, time, weather, and screen of an application installed in the electronic device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a frame;
a window supported by the frame;
a light source configured to output visual information to the window;
at least one camera disposed in the frame and configured to photograph a front of the frame;
communication circuitry;
memory; and
at least one processor operatively connected to the communication circuitry, and the camera,
wherein the memory stores instructions that, when executed by the at least one processor, cause the electronic device to:
identify at least one real object in a specific area based on an image captured by the at least one camera,
identify, from among the at least one real object, one or more first real objects each of which corresponds to a first device having a capability of a wireless communication connection with the electronic device,
establish a communication connection with the one or more first devices through the communication circuitry,
identify, from among the one or more first devices, a first device having a display and acquire display attribute information of the display through the corresponding communication connection, wherein the display attribute information includes magnification of display, resolution of display, orientation of display, or whether multiple displays are enabled,
display a first virtual object having the same display attribute as the display in the window at a location corresponding to a location of the display in the specific area, based on the acquired display attribute information,
identify, from among the least one real object, one or more second real objects with which no communication connection is established,
display one or more second virtual objects corresponding to the one or more second real objects, and
provide a guide screen for changing or deleting an arrangement of the one or more second virtual objects in the window,
wherein the guide screen is configured to allow association of a function with a second virtual object displayed in the window.

2. The electronic device of claim 1, wherein the memory stores instructions that, when executed by the at least one processor, cause the electronic device to acquire physical information including at least one of a number, a location, or a distance to a user of the display.

3. The electronic device of claim 2, wherein the memory stores instructions that, when executed by the at least one processor, cause the electronic device to display the first virtual object to be identical with the display in at least one of the number, the location, or the distance to the user, based on the physical information of the display.

4. The electronic device of claim 1, wherein the memory stores instructions that, when executed by the at least one processor, cause the electronic device to identify, from among the at least one real object, one or more user interface devices connected to the first device, and acquire physical information including at least one of a number, a type, a location, or a distance to a user, of the one or more user interface devices.

5. The electronic device of claim 4, wherein the memory stores instructions that, when executed by the at least one processor, cause the electronic device to display the or more second virtual objects to be identical with the one or more user interface devices in at least one of the number, the type, the location, or the distance to the user, based on the acquired physical information of the one or more user interface devices.

6. The electronic device of claim 1, wherein the memory stores instructions that, when executed by the at least one processor, cause the electronic device to display the first virtual object, based on an input to the electronic device.

7. The electronic device of claim 6, wherein the guide screen is further configured to allow changing a location of the one or more second virtual objects, deleting at least one of the one or more second virtual objects, or adding one or more second virtual objects, and recognize an input to the electronic device through the guide screen.

8. The electronic device of claim 1, wherein the memory stores instructions that, when executed by the at least one processor, cause the electronic device to:
 display a widget for performing the function associated with the second virtual object,
 wherein the function includes displaying at least one of date, time, weather, or a screen of an application installed in the electronic device.

9. An electronic device comprising:
a frame;
a window supported by the frame;
a light source configured to output visual information to the window;
at least one camera disposed in the frame and configured to photograph a front of the frame;
communication circuitry;
memory; and
at least one processor operatively connected to the communication circuitry, and the camera,
wherein the memory stores instructions that, when executed by the at least one processor, cause the electronic device to:
 establish a first communication connection with a first device in a first space through the communication circuitry, and transmit and/or receive data through the first communication connection,
 establish a second communication connection with a second device in a second space through the communication circuitry, and transmit and/or receive data through the second communication connection,
 acquire first display attribute information of at least one first display of the first device, construct a first space in a virtual space including at least one first virtual object comprising a first display object configured to have a same display attribute as the at least one first display in the window, based on the acquired first display attribute information, and store information about the at least one first virtual object as first environment information,
 acquire second display attribute information of at least one second display connected to the second device, construct a second space in the virtual space including at least one second virtual object comprising a second display object configured to have a same display attribute as the at least one second display in the window, based on the acquired second display attribute information, and store information about the at least one second virtual object as second environment information,
 provide a guide for selecting one of the first environment information or the second environment information,
 identify one or more objects within a specific area with which no communication connection is established,
 display one or more third virtual objects corresponding to the one or more second objects,
 provide a guide screen for changing or deleting an arrangement of the one or more second virtual objects in the window,
 wherein the guide screen is configured to allow association of a function with a third virtual object displayed in the window.

10. A method for providing an augmented reality service at an electronic device, the method comprising:
 identifying at least one real object in a specific area based on an image captured by at least one camera,
 identifying, from among the at least one real object, one or more first real objects each of which corresponds to a first device having a capability of a wireless communication connection with the electronic device,
 establishing a communication connection with the one or more first devices,
 identifying, from among the one or more first devices, a first device having a display and acquiring display attribute information of the display through the corresponding communication connection, wherein the display attribute information includes magnification of display, resolution of display, orientation of display, or whether multiple displays are enabled,
 displaying a first virtual object having a same display attribute as the display at a location corresponding to a location of the display in the specific area, based on the acquired display attribute information,
 identifying, from among the least one real object, one or more second real objects with which no communication connection is established,
 displaying one or more second virtual objects corresponding to the one or more second real objects, and
 providing a guide screen for changing or deleting an arrangement of the one or more second virtual objects,
 wherein the guide screen is configured to allow association of a function with a displayed second virtual object.

11. The method of claim 10, further comprising:
 acquiring physical information including at least one of a number, a location, or a distance to a user of the display.

12. The method of claim 11, further comprising:
displaying the first virtual object to be identical with the display in at least one of the number, the location, or the distance to the user, based on the physical information of the display.

13. The method of claim 11, further comprising:
identifying, from among the at least one real object, one or more user interface devices connected to the first device; and
acquiring physical information including at least one of a number, a type, a location, or a distance to the user of the one or more user interface devices.

14. The method of claim 13, further comprising:
displaying the one or more second virtual objects to be identical with the one or more user interface devices in at least one of the number, the type, the location, or the distance to the user, based on the acquired physical information of the one or more user interface devices.

15. The method of claim 10, comprising:
displaying the first virtual object, based on an input to the electronic device.

16. The method of claim 15, wherein:
the guide screen is further configured to allow changing a location of the one or more second virtual objects, deleting at least one of the one or more second virtual objects, or adding one or more second virtual objects; and
recognizing an input to the electronic device through the guide screen.

* * * * *